United States Patent
Tomita

(10) Patent No.: US 6,665,486 B2
(45) Date of Patent: Dec. 16, 2003

(54) SINGLE PHOTON GENERATING APPARATUS

(75) Inventor: Akihisa Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 112 days.

(21) Appl. No.: 09/780,694

(22) Filed: Feb. 14, 2001

(65) Prior Publication Data

US 2001/0016095 A1 Aug. 23, 2001

(30) Foreign Application Priority Data

Feb. 17, 2000 (JP) ........................................ 2000-039212

(51) Int. Cl.[7] ................................................ G02B 6/00
(52) U.S. Cl. .......................... 385/147; 385/15; 385/39; 372/6; 372/46; 372/82
(58) Field of Search ............................ 385/147, 15, 39; 372/6, 46, 82

(56) References Cited

U.S. PATENT DOCUMENTS

| | | | | |
|---|---|---|---|---|
| 5,297,158 A | * | 3/1994 | Naitou et al. ................. | 372/45 |
| 5,917,195 A | * | 6/1999 | Brown ......................... | 257/22 |
| 6,298,180 B1 | * | 10/2001 | Ho ............................... | 385/15 |

FOREIGN PATENT DOCUMENTS

JP          2000-039212        2/1992

OTHER PUBLICATIONS

IEEE International Conference on Computer, Systems, and Signal Processing, (Bangalore, India, pp. 175–179, (1984).
H.J. Briegel et al. Quantum Repeaters: The Role of Imperfect Local Operations in Quantum Communication, Physical Review Letters, Dec. 28, 1998. vol. 81. No. 26.
F. De Martini, et al. Single–Mode Generation of Quantum Photon States by Excited Single Molecules in a Microcavity Trap, Physical Review Letters. Feb. 5, 1996. vol. 76 No. 6.
C.K. Law & H.J. Kimble. Deterministic Generation of a Bit–Stream of Single–Photon Pulses, Journal of Modern Optics. 1997 vol. 44, No. 11/12.
J. Kim et al. A Single– Photon Turnstile Device, Nature, Feb. 11, 1999 vol. 397
L. Collot, et al. Very High–Q Whispering–Gallery Mode Resonances Observed on Fused Silica Microspheres. Europhysics Letters. Aug. 10, 1993.
IEEE International Conference on Computer, Systems, and Signal Processing, (Bangalore, India, pp.175–179, (1984).
H.J. Briegel et al., Quantum Repeaters: The role of Imperfect Local Operations in Quantum Communication, Physical Review Letters, Dec. 28, 1998. vol. 81, No. 26.
F.De Martini, et al., Single–Mode Genration of Quantum Photon States by Excited Single Molecules in a Microcavity Trap, Physical Review Letters, Feb. 25, 1996, vol. 76, No. 6.
C.K. Law & HJ. Kimble, Deterministic Generation of a Bit–Stream of Single–Photon Pulses, Journal of Modern Optics, 1997 Vol. 44, No. 11/12.
J. Kim et al., A Single–Photon Turnstile Device, Nature, Feb. 11, 1999 vol. 397.
L. Collot, et al., Very High–Q Whispering–Gallery mode Resonances Observed on Fused Silica Microspheres, Europhysics Letters, Aug. 10, 1993.

* cited by examiner

Primary Examiner—Robert H. Kim
Assistant Examiner—George Y. Wang
(74) Attorney, Agent, or Firm—Katten Muchin Zavis Rosenman

(57) ABSTRACT

A single photon generating apparatus includes an optical waveguide, an active medium section and a resonator section. In the active medium section, a single electron is excited in response to application of exciting energy, and a single photon is emitted from the electron. The resonator section optically resonates with the active medium section, holds the photon emitted from the electron in the resonator, and transfers the held photon to the optical waveguide in response to a first control signal.

26 Claims, 4 Drawing Sheets

SINGLE PHOTON GENERATING APPARATUS

BACKGROUND OF THE INVENTION

1. Field of the Invention

The present invention relates to a single photon generating apparatus.

2. Description of the Related Art

With explosively spreading Internet and practically beginning electronic commerce, encryption technique is needed for reservation of secrecy of communication and personal identification. As the encryption technique widely used, there are a common key method such as a DES encryption and an open key method such as a RAS encryption.

However, the conventional encrypting technique is based upon "quantitative security". Therefore, these encrypting method are always threatened by progressing computer hardware and decrypting algorithm. Accordingly, if a theoretically secure encrypting method is put into practice in various fields, where extremely high security is required, such as transactions between banks and information concerning military affairs and diplomacy, the impact thereof will be great.

Studies of quantum encryption have been extensively conducted since the proposal of a specific protocol made by Bennett, Brassard et al. in IEEE International Conference on Computers, Systems, and Signal Processing, (Bangalore, India, p. 175, (1984)). As an encrypting method in which unconditional security has been proved in information theory, there is a one-time pad method. The proposed quantum encryption protocol provides a method of securely delivering an encryption key used in the one-time pad method. Since the security of quantum encryption is guaranteed by physical rules, an ultimately guaranteed security can be accomplished which does not depend upon performance limitations of computers. The quantum encryption bases its security upon the fact that a wiretapper cannot know the state of one photon completely. Therefore, it is required to transmit information of one bit by use of only one photon in order to guarantee the security of quantum encryption. That is, it is important for a quantum encrypting apparatus to generate a single photon securely at a predetermined time.

It is known that the use of a pair of entangled photons is effective for quantum encryption. For example, Briegel et al. have reported that a quantum state can be relayed by using a pair of entangled photons (Physical Review Letters, Vol. 81, p. 5932, 1998). Usually, for generating a pair of entangled photons, a method called Parametric Down Conversion is used. In this method, a pair of photons having one half of energy of incident light into a nonlinear optical crystal are generated.

However, many combinations of photons are possible concurrently within a range satisfying the principle of conservation of energy and number of waves in this method. Therefore, the generation of a pair of photons to be obtained is probabilistic, and moreover, the generation probability is very low in the order of one-ten thousandth. Thus, this method is not practical.

In contrast thereto, a pair of entangled photons can be obtained by connecting the outputs of two single photon generating apparatus to a quantum gate such as a control NOT gate. In this method, a pair of entangled photons can be obtained efficiently. However, two apparatus, that is, a single photon generating apparatus and a photon control unit (quantum gate), are newly required.

In order to realize a single photon generating apparatus applicable to quantum encryption, the following two factors are required: (1) Only one electron is excited, and the excited state is maintained till the electron emits a photon and returns to the ground state thereof; and (2) the photon is taken out from the apparatus at a predetermined time.

In the report by De Martini et al. (Physical Review Letters, Vol. 76, p. 900, 1996) and in the report by Law and Kimble (Journal of Modern Optics, Vol. 44, p. 2067, 1997), it has been proposed to control the intensity and time period of excited pulse light in order to excite a single electron.

Moreover, Susa has proposed a single photon generating element in Japanese Laid Open Patent application (JP-A-Heisei 4-61176), in which electrons are injected one by one into a semiconductor active layer by using a phenomenon in which the tunneling of the electron is prevented due to the change of electric field caused by the single electron existing in a semiconductor thin film, that is, by using so-called a coulomb blockade.

Kim et al. have reported a single photon generating element in which electrons are injected one by one into a semiconductor active layer by means of a method called turn style based upon a principle similar to the above technique (Nature, Vol. 397, p. 500, 1999).

However, in the single photon generating methods of Susa and Kim et al., the generation of a photon is a probabilistic event caused in a time period determined based on the lifetime of the electron in the exited state. The generated photon is immediately emitted out of the apparatus. Therefore, the time period during which the photon is emitted is relatively wide in the order of nanoseconds. Since generally used photon detectors can analyze such time period, these methods are insufficient to emit the photon out of the apparatus at a predetermined time.

On the other hand, it is known that the light emission efficiency increases by using a micro resonator having a high Q-value as proposed by De Martini as well as Law and Kimble. By utilizing this effect, the time period of light emission can be narrowed. However, the generated photon cannot easily leave the resonator and leaks out of the resonator over a long time. Therefore, the time when a photon is emitted out of the apparatus cannot be determined.

For example, Collot et al. have reported that a high Q-value of $2 \times 10^9$ is obtained by using a whispering gallery mode resonator (Europhysics Letters, Vol. 23, p.327, 1993). Since the frequency of light is in the order of $10^{15}$ Hz, the lifetime of the photon in this resonator is almost a microsecond.

In conjunction with the above description, a single photon generating apparatus is disclosed in Japanese Laid Open Patent Application (JP-A-Heisei 4-61176). In this reference, a first semiconductor is sandwiched between second and third semiconductors. The first semiconductor has electron affinity larger than the second and third semiconductors and a band gap energy smaller than the second and third semiconductors. P-type or n type impurity is doped in either one of the second and third semiconductors and the other semiconductor is not doped. The other semiconductor has the thickness in a range of 1 nm to 20 nm.

SUMMARY OF THE INVENTION

Therefore, an object of the present invention is to provide a single photon generating apparatus which can emit a single photon out of the apparatus at a predetermined time.

In an aspect of the present invention, a single photon generating apparatus includes an optical waveguide, an active medium section and a resonator section. In the active medium section, a single electron is excited in response to application of exciting energy, and a single photon is emitted from the electron. The resonator section optically resonates with the active medium section, holds the photon emitted from the electron in the resonator, and transfers the held photon to the optical waveguide in response to a first control signal.

The application of the exciting energy may be achieved by application of a first light pulse. In this case, it is preferable that the first light pulse has a duration time shorter than a recombination time of the electron.

Also, the active medium section may include a semiconductor substrate, a quantum dot, a cap layer and first and second electrodes. The quantum dot is formed on the semiconductor substrate, and the electron is excited in response to the application of the exciting energy. The cap layer is provided between the quantum dot and the resonator section and optically separates the quantum dot from the resonator in response to a second control signal. The first electrode is formed on the cap layer apart from the quantum dot in a horizontal direction. The second electrode is formed on a surface of the semiconductor substrate opposite to the quantum dot in correspondence to the first electrode. The first light pulse is applied to the quantum dot from a region where the second electrode is not formed.

In this case, it is preferable that the cap layer has a thickness equal to or less than ½ of a wavelength of the photon.

Also, the single photon generating apparatus may further include a first applying section which applies a first electric signal between the first and second electrodes after the first light pulse is applied such that the quantum dot is optically separated from the resonator section. In this case, the first applying section may apply the first electric signal between the first and second electrodes in response to application of a second light pulse to the first applying section.

Also, the resonator section may include a resonator and a connection member. The resonator optically resonates with the active medium section, and holds the photon therein. The connection member is provided between the resonator and the optical waveguide and passes the photon from the resonator to the optical waveguide in response to a second control signal.

In this case, it is preferable that the resonator has a Q value equal to or larger than $10^4$. Also, the resonator is preferably formed of either semiconductor, dielectric substance, or a local defective portion of photonic crystal where periodicity is disturbed.

Also, the resonator preferably has a spherical shape which has a characteristic length in a range from ½ of a wavelength of the photon to 100 times of the wavelength of the photon.

Also, the connection member may be made of electrooptic effect material, and the connection member changes a refractive index in response to the second control signal such that the photon is passed from the resonator to the optical waveguide.

Moreover, the single photon generating apparatus may further include a second applying section which applies a voltage signal as the second control signal to the connection member. In this case, the second applying section applies the second control signal to the connection member in response to application of a third pulse signal. Also, it is preferable that a response time of the second applying section is shorter than a lifetime of the photon.

Also, the optical waveguide is preferably arranged such that optical coupling between the optical waveguide and the resonator section in a whispering gallery mode is minimum.

Also, the active medium section may include a quantum dot in which the electron is excited in response to the application of the exciting energy such that the photon is emitted, and the resonator section may be formed by a first region of a photonic crystal other than a second region. At this time, openings are arranged in triangular lattice in the second region of the photonic crystal, and the quantum dot is arranged in the first region.

Also, the single photon generating apparatus may further include a light pulse applying section which applies a fourth light pulse as the first control signal to the resonator section. The resonator section changes a refractive index in response to the fourth light pulse such that the photon is connected to the optical waveguide.

In another aspect of the present invention, a method of generating a single photon, is attained by (a) exciting a single electron in a quantum dot; by (b) confining a single photon generated from the electron in a resonator; and by (c) leading the confined photon into an optical waveguide.

In this case, the electron is excited in the quantum dot in response to application of a light pulse. Also, it is preferable that the quantum dot is optically separating from the resonator after the photon is emitted from the electron.

Also, the resonator may be optically connecting with the optical waveguide in response to a control signal when the photon is confined in the resonator. In this case, a refractive index of a connection member which is provided between the resonator and the optical waveguide is changed in response to the control signal such that the connection member is transparent to the photon. The control signal may be a light pulse signal.

Also, a refractive index of the resonator may be changed in response to the control signal such that the photon is connected to the optical waveguide.

DESCRIPTION OF THE PREFERRED EMBODIMENTS

Hereinafter, a single photon generating apparatus of the present invention will be described below in detail with reference to the attached drawings.

Figure 1:
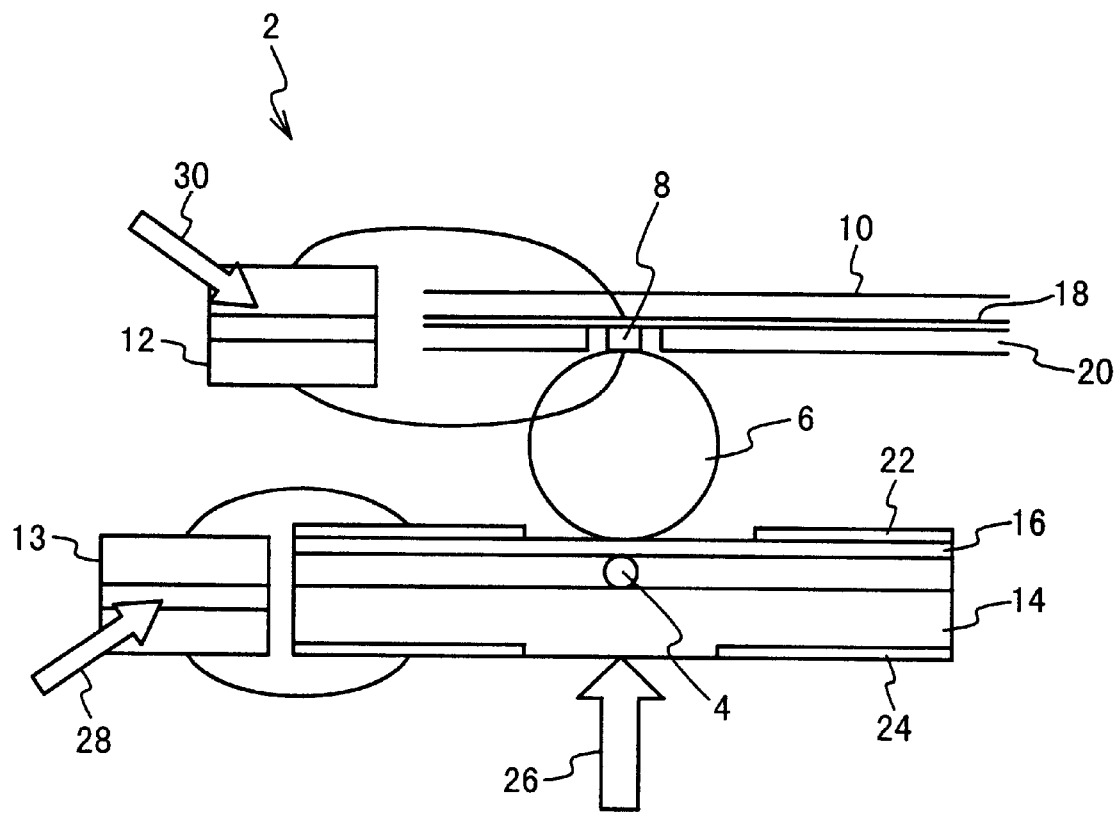
FIG. 1 is a cross-sectional side view showing the structure of a single photon generating apparatus according to a first embodiment of the present invention.
Figure 2:
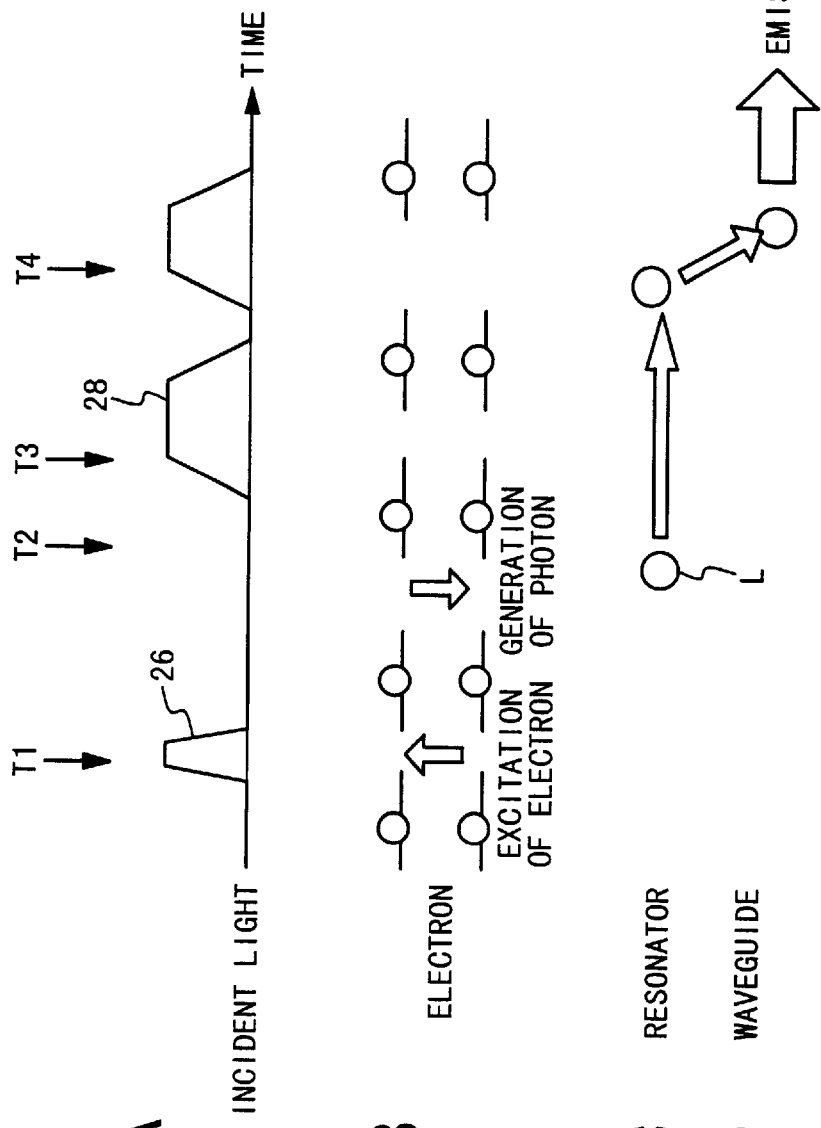
FIGS. 2A to 2D are timing charts showing the operation of the single photon generating apparatus of FIG. 1.

FIG. 1 is a cross-sectional side view showing the structure of a single photon generating apparatus according to a first embodiment of the present invention. FIG. 2 is a timing chart showing the operation of the single photon generating apparatus of FIG. 1.

As shown in FIG. 1, the single photon generating apparatus 2 in the first embodiment of the present invention is mainly composed of a quantum dot (active medium) 4, a micro sphere (resonator) 6, a connecting member 8, an optical waveguide 10, a first photoelectric switch 13 and a second photoelectric switch 12.

The quantum dot 4 is formed of a semiconductor material on a semiconductor substrate 14. The quantum dot 4 has an energy level corresponding to a photon to be generated. When a light pulse is irradiated, one electron is exited based on exciting energy of the light pulse. A cap layer 16 is formed of a semiconductor material transparent to a photon generated and is provided on the quantum dot 4 to contact the quantum dot 4. The cap layer 16 reduces re-combination probability of the electron on the surface of the quantum dot 4. The thickness of the cap layer 16 is not more than half of the wavelength of the generated photon. Therefore, light leaking from the micro sphere 6 can be coupled with the quantum dot 4 through the cap layer 16. The micro sphere 6 optically resonates with the quantum dot 4 via the cap layer 16.

The micro sphere 6 is formed spherically of a material transparent to the photon generated by the quantum dot 4 and is disposed on the quantum dot 4 via the cap layer 16 to contact the cap layer 16. The radius of the micro sphere 6 is set to a value in range of a half of the wavelength of the photon to hundred times of the wavelength of the photon. The whispering gallery mode of the micro sphere 6 is resonant with the energy of the photon, and therefore, the micro sphere 6 acts as a resonator having a high Q-value. It is preferable that the micro sphere 6 has a Q value equal to or larger than $10^4$.

The waveguide 10 extends in the upper portion of the micro sphere 6 to guide the photon emitted from the micro sphere 6 out of the apparatus. The waveguide 10 is composed of a core 18 and a clad 20, and the underside of the clad 20 is partially removed in the top of the micro sphere 6, thereby exposing the core 18. A connecting member 8 is provided between the exposed core 18 and the top of the micro sphere 6. The connecting member 8 is formed of an electro-optical material and is selectively set to a transparent state to the photon. The distance between the waveguide 10 and the top of the micro sphere 6 is set in such a manner that the coupling of the micro sphere 6 and the waveguide 10 may be minimum to the whispering gallery mode of the micro sphere 6.

The second photoelectric switch 12 as a photon leading control section is formed of electrodes provided in the interval of several micrometers on a semiconductor layer which has been grown at a low temperature. When light is irradiated between the electrodes, a voltage is generated therebetween. This voltage is applied to the connecting member 8. The response time of the second photoelectric switch 12 is sufficiently shorter than the photon recombination time, so that the voltage can be applied to the connecting member 8 at a high precise in time.

Further, in this embodiment, the first photoelectric switch 13 as an active medium control section is provided to have a structure similar to that of the second photoelectric switch 12. As shown in FIG. 1, electrodes 22 and 24 are formed on the upper and lower surfaces of the semiconductor substrate 14 in a region other than a region where the quantum dot 4 is formed. A voltage generated by the first photoelectric switch 13 is applied between the electrodes 22 and 24.

Now, the operation of the single photon generating apparatus 2 structured as described above will be described also with reference to FIG. 2.

Referring to FIG. 2, first, at a timing T1, a light pulse or exciting light pulse 26 is irradiated or applied to the quantum dot 4. The exciting light pulse 26 has exciting energy larger than the transition energy of the quantum dot 4 and smaller than the band gap of the semiconductor substrate 14 or the gap layer 16. By irradiating such an exciting light pulse 26, a single electron is excited in the quantum dot 4. The time period or duration time of the exciting light pulse 26 is set to be shorter than a re-combination time of the electron in the quantum dot 4.

It should be noted that two electrons can be exited in one energy level of the quantum dot 4. However, due to interaction between the electrons, the energy required when the two electrons are excited in the quantum dot 4 is different from the energy required when a single electron is excited. There is no case that two electrons are excited when the exciting light pulse 26 is irradiated. Moreover, when the time period of the exciting light pulse 26 is set to be longer than the re-combination time in the quantum dot 4, there is a possibility that an electron excited in the quantum 4 re-combines to generate a photon so that another electron is excited in the quantum dot 4 again to generate two or more electrons. Therefore, the time period of the exciting light pulse 26 is set to be shorter than the re-combination time of the electron in the quantum dot 4, as described above.

Since the excited electron in the quantum dot 4 is resonant with the whispering gallery mode of the micro sphere 6, the electron re-combines in a shorter time than in free space. Thus, a photon is emitted. The ratio of natural emission probability in case of a resonant mode and natural emission probability in case of free space is $(\tfrac{3}{4}\pi)(\lambda^{3/V})Q$, where $\lambda$ is the wave length of a photon, V is the volume of a resonator, and Q is the Q-value of the resonator. Taking specific values as an example, when the characteristic length of the resonator (micro sphere 6 in this embodiment) is 100 times as large as the wavelength, and Q is $10^9$, the natural emission probability in the resonant mode rises to $10^3$ times as high as in free space.

While the light emission re-combination time of the electron in a semiconductor is in the order of 10 ns, it is 10 ps in the micro sphere 6. Therefore, the time when a photon is generated in the micro sphere 6 can be determined precisely. If the resonator 6 is larger, the Q-value cannot be improved, and in contrast thereto, the natural emission probability falls due to an increased volume thereof. On the other hand, the characteristic length of the resonator 6 becomes less than (½) of the wavelength of the photon, and the natural emission probability falls due to a fallen Q-value.

When the re-combination time of the electron have passed away after excitation of the electron, a photon L (FIG. 2) is generated. The single photon exists in the whispering gallery mode of the micro sphere 6 (timing T2).

Next, a first control light pulse 28 is irradiated to the first photoelectric switch 13 at a timing T3. Thereby, the first photoelectric switch 13 generates a voltage, which is applied between the electrodes 22 and 24 of the semiconductor substrate 14. As a result, an electric field is applied to the quantum dot 4 to change the resonant energy of the quantum dot 4. Thus, the resonant state with the micro sphere 6 is eliminated and the quantum dot 4 is optically separated from the micro sphere 6. Therefore, the photon in the micro sphere 6 is not absorbed again by the quantum dot. Thus, the photon is held or confined in the micro sphere 6.

Subsequently, at a timing T4, when a second control light pulse 30 is irradiated to the second photoelectric switch 12, the second photoelectric switch 12 generates a voltage pulse to apply to the connecting member 8. Thereby, the refractive index of the connecting member 8 made of an electro-optical material changes, so that the reflectance on the reflective surface of the micro sphere 6 contact with the connecting member 8 decreases. Therefore, the waveguide 10 is coupled with the whispering gallery mode of the micro sphere 6, and the photon is led to the optical waveguide 10 and is emitted out of the apparatus through the optical waveguide 10.

Accordingly, by controlling the timings of supplying the first and second control light pulses 28 and 30 to the first and second photoelectric switches 13 and 12 respectively, the single photon generating apparatus 2 of the first embodiment can emit a single photon out of the apparatus at a predetermined time. In the connecting member 8, the speed of the change of the refractive index due to an electro-optical effect when the voltage signal is applied is determined based on a time constant of the circuit. The speed is sufficiently high in this embodiment. The emission of the photon in response to the second control light pulse 30 can be determined in the order of picoseconds, including the operation time of the second photoelectric switch 12.

Further, the exciting light pulse 26 as well as the first and second control light pulses 28 and 30 are irradiated once. However, when these light pulses are irradiated repeatedly with the time relation as described above, one photon can be emitted each time.

In the first embodiment, as described above, one electron is excited by irradiating the exciting light pulse 26 on the quantum dot 4. However, since only two electrons having different spin directions can enter the ground level, only one electron may be excited by irradiating a circular polarized light pulse to the quantum dot 4.

Moreover, as an active medium, an atom or a molecule may be used which has an excitation level whose energy is sufficiently distanced from other levels. In this case, by setting the time period of the exciting light pulse 26 to be sufficiently shorter than the light emission re-combination lifetime, the number of electrons excited with one excitation pulse can be limited to one. Thus, as in the quantum dot 4, a single photon can be generated.

Further, in addition to exciting the active medium by irradiating light, the active medium may be excited with an electric pulse through a tunnel barrier.

In the first embodiment, the resonator 6 is realized by using the whispering gallery mode of the micro sphere 6. However, the resonator is not required to be a true sphere and may be a disk shape as long as a high Q-value can be obtained.

Moreover, the micro sphere 6 may be formed of a dielectric other than a semiconductor.

Further, a defective portion obtained by disturbing the periodicity locally in part of a so-called photonic crystal in which layers of materials having different refractive indexes are arranged in periods approximately equal to their wavelengths may be used as a micro resonator. By use of such a resonator, a high Q-value can be obtained. As a resonator, in addition to the above-described ones, any form may be employed as long as a high Q-value can be obtained.

In this embodiment, the connecting member 8 is formed of a material having an electro-optical effect. However, the connecting member 8 may be formed of a material having a nonlinear optical effect. In this case, no photoelectric switches are used, and a light pulse is irradiated directly to the connecting member 8 to change the refractive index. Therefore, the structure of the apparatus becomes simple. Also, in this case, the timing of photon emission can be determined with a precision in the order of picoseconds.

It should be noted that the energy of a control light pulse is required to be different from the energy of a photon to be generated. Also, the control light pulse may be as intensive as possible as long as it generates no photons in the vicinity of the energy of the photon to be generated due to nonlinear light mixture. Therefore, a usual material can be used as a material having a nonlinear optical effect.

Moreover, in this embodiment, a voltage is applied on the connecting member 8 by the second photoelectric switch 12. However, as long as an electric pulse can be transferred without changing the waveform, a structure in which an electric pulse is applied directly to the connecting member 8 from an electric pulse generating apparatus may be employed.

Now, the single photon generating apparatus according to the second embodiment of the present invention will be described.

Figure 3:
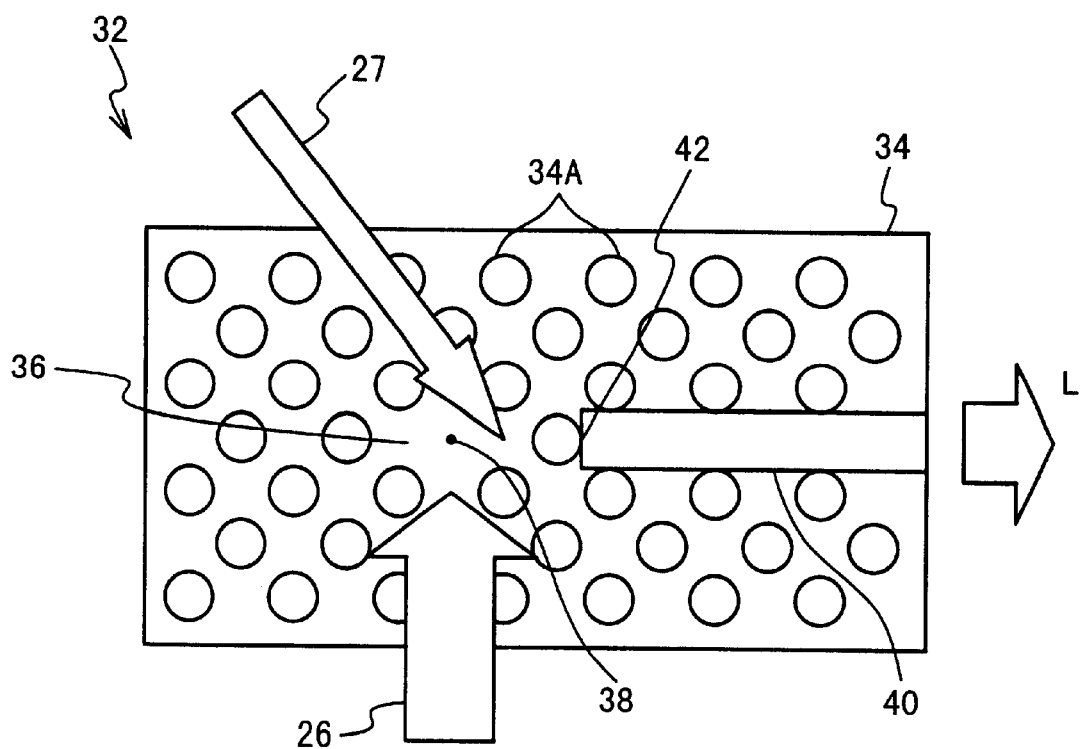
FIG. 3 is a cross-sectional side view of a single photon generating apparatus in the second embodiment.
Figure 4A:
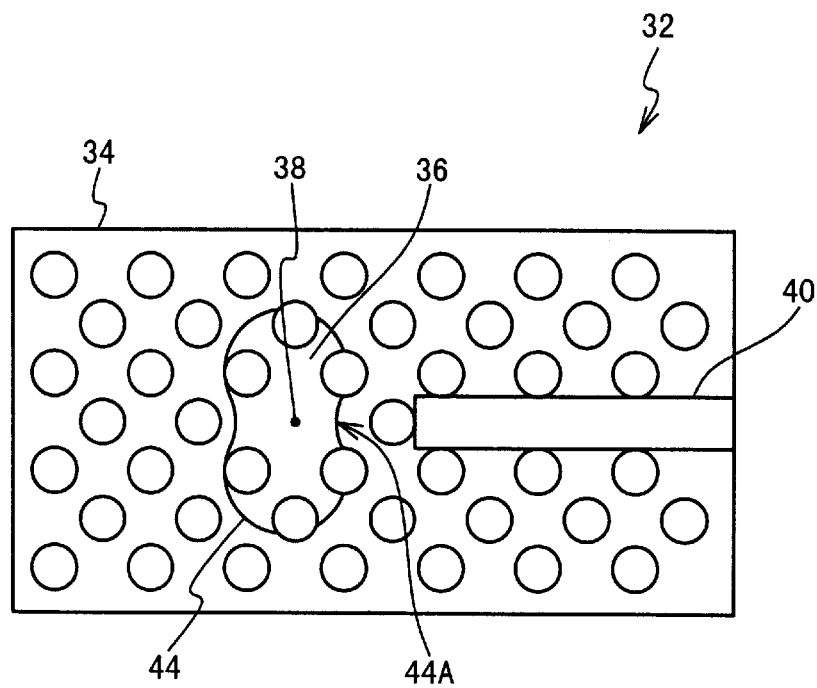
FIGS. 4A and 4B are cross-sectional views showing the operation of the second embodiment.
Figure 4B:
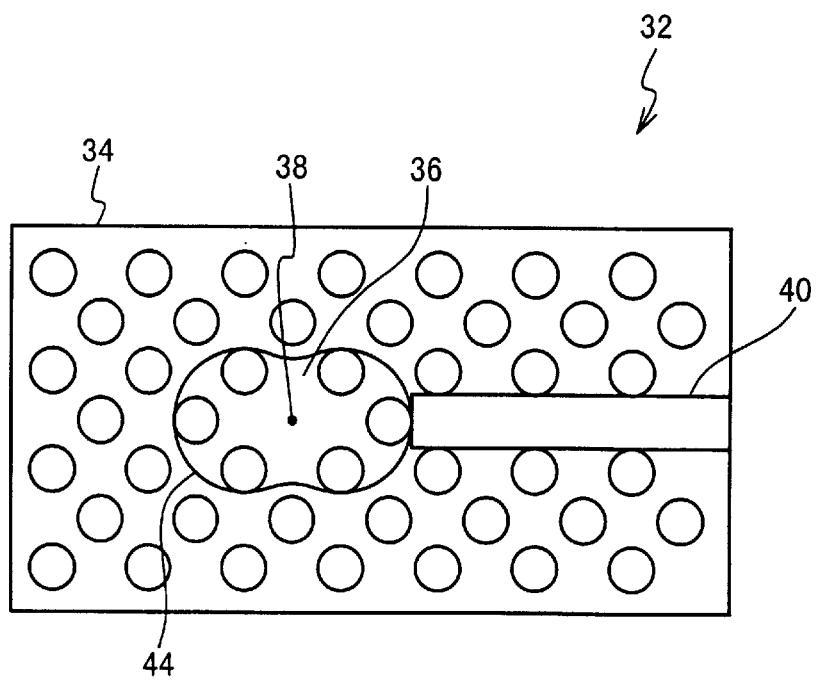

FIG. 3 is a cross-sectional side view of a single photon generating apparatus 2 in the second embodiment, and FIGS. 4A and 4B are cross-sectional views showing the operation of the second embodiment. The single photon generating apparatus 32 of the second embodiment is different from the single photon generating apparatus 2 of the first embodiment in that a photon in the resonator is emitted to an optical waveguide 40 by changing the refractive index of the resonator itself.

As shown in FIG. 3, the single photon generating apparatus 32 of the second embodiment is composed of a semiconductor layer 34, a micro resonator 36, a quantum dot 38 (active medium) formed of a semiconductor, and the optical waveguide 40.

The semiconductor layer 34 is formed by depositing a semiconductor material on a dielectric layer (not shown). In this semiconductor layer 34, holes 34A are formed regularly in a triangular lattice in a region other than a center portion. The interval between the holes 34A is about practical wavelength of a photon to be generated. Thus, a photonic crystal is formed. In the photonic crystal, there is an energy region where the state density of photons is zero, i.e., so-called a photonic band gap. However, in the center portion where no hole is formed, a mode is formed in which light is localized. The modes exist in several positions in the photonic band gap and have different electric field distributions, respectively. The portion where light is localized becomes the micro resonator 36.

The quantum dot 38 is disposed almost in the center of the micro resonator 36 and coupled with the micro resonator 36. The conditions are set in such a manner that the transition energy in the quantum dot 38 is equal to the energy of one of the modes of the micro resonator 36.

The waveguide 40 extends in the semiconductor layer 34 with one end 42 of the waveguide 40 being adjacent to the micro resonator 36. In detail, as shown in FIG. 4A, the one end 42 of the waveguide 40 is located in a position 44A where the electric field distribution 44 due to the mode of a photon becomes relatively small when the photon exists in the micro resonator 36.

In the single photon generating apparatus 32 structured as described above, when one electron is excited in the quantum dot 38 by irradiating an exciting light pulse 26, there exists one photon in the micro resonator 36, as in the first embodiment. The electric field distribution due to the mode of the photon is small in the vicinity of the waveguide 40 as described above (FIG. 4A). Therefore, the micro resonator 36 has a high Q-value. In this state, when a control light pulse 27 is irradiated to the micro resonator 36 from a control pulse generating section (not shown), the refractive index of the micro resonator 36 changes due to the nonlinear optical effect of the semiconductor. As a result, the electric field distribution changes as shown in FIG. 4B, and the mode of the photon changes to easily combine with the waveguide 40. Therefore, the photon L is led rapidly to the waveguide 40 and is emitted out of the apparatus through the waveguide 40.

Accordingly, in the single photon generating apparatus 32 in the second embodiment, the timing of irradiating the exiting light pulse 26 to the quantum dot 38 and the timing of starting the control light pulse generating section are controlled. Thus, it is possible to emit a single photon out of the apparatus at a predetermined time.

It should be noted that it is possible to use as the quantum dot 38, a unit formed of atoms, molecules, and ions which can generate a photon having desired energy, in addition to the quantum dot as a unit formed of a semiconductor.

Also, in the second embodiment, the photonic crystal for forming the micro resonator 36 is made up by the holes arranged in a triangular lattice in the semiconductor layer 34. However, as the photonic crystal, any modification may be used as long as it has a photonic band gap in the wavelength of photon having desired energy.

Moreover, as the micro resonator having a high Q-value, the whispering gallery mode of a micro sphere may be used. In this case, a control light pulse is irradiated to the micro sphere to change the refractive index of the micro sphere, so that the photon in the micro sphere 6 can be moved or transferred to the waveguide 40. There exist several whispering gallery modes having similar energy and the electric field distributions of the modes are different from each other. In this case, therefore, the electric field distribution can be switched, as in the above-mentioned case.

Further, in the second embodiment, the nonlinear optical effect of the semiconductor is used to change the refractive index of the micro resonator 36. However, the micro resonator may be formed of a material having an electro-optical effect, and the refractive index may be changed or controlled by applying an electric field distribution by a photoelectric switch or an electric pulse.

As described above, in the single photon generating apparatus according to the present invention, a light pulse having a sufficiently short duration time is irradiated to an active medium or an electric field is applied to the active medium. At this time, one electron is excited in the active medium, and the excited electron re-combines with a hole to generate one photon. Since the resonator has a mode resonant with this photon, the photon stays in the resonator so that the resonator is in a resonant state. Subsequently, when the refractive index controlling section changes the reflectivity of the connecting member, the reflectivity is decreased in the boundary between the resonator and the connecting member. Thus, it is possible for the photon to be transferred or moved from the resonator to the connecting member. The photon is transferred to the light guide portion through the connecting member and is emitted out of the apparatus through the light guide portion.

Also, in the single photon generating apparatus according to the present invention, light pulse having a sufficiently short duration time is irradiated to an active medium or an electric field is applied to the active medium. Thus, one electron is excited in the active medium, and the excited electron re-combines to generate a single photon. Since the resonator has a mode resonant with this photon, the photon exists in the resonator and the resonator is in a resonant state. Subsequently, when the refractive index controlling section changes the refractive index of the connecting member, the resonant state of the resonator is canceled, so that the photon cannot exist in the resonator any more. Therefore, the photon transferred to the light guide portion through the connecting member and is emitted out of the apparatus through the light guide portion.

In this way, in the present invention, it is possible to emit a single photon out of the apparatus at a predetermined time by controlling the timing of exciting the active medium and the timing of starting the refractive index controlling section properly.

What is claimed is:

1. A single photon generating apparatus comprising:
   an optical waveguide;
   an active medium section in which a single electron is excited in response to application of exciting energy, wherein a single photon is emitted from said electron; and
   a resonator section which optically resonates with said active medium section, holds said photon emitted from said electron in said resonator, and transfers said held photon to said optical waveguide in response to a first control signal,
   wherein said active medium section includes a quantum dot in which said electron is excited in response to the application of said exciting energy such that said photon is emitted, and wherein said quantum dot is optically separated from said resonator section after said photon is emitted from said electron.

2. The single photon generating apparatus according to claim 1, wherein the application of said exciting energy is achieved by application of a first light pulse.

3. A single photon generating apparatus comprising:
   an optical waveguide;
   an active medium section in which a single electron is excited in response to application of exciting energy, wherein a single photon is emitted from said electron; and
   a resonator section which optically resonates with said active medium section, holds said photon emitted from said electron in said resonator, and transfers said held photon to said optical waveguide in response to a first control signal,
   wherein said active medium section includes a quantum dot in which said electron is excited in response to the application of said exciting energy such that said photon is emitted, and wherein said quantum dot is optically separated from said resonator section after said photon is emitted from said electron, and
   wherein the application of said exciting energy is achieved by application of a first light pulse, and wherein said first light pulse has a duration time shorter than a recombination time of said electron.

4. A single photon generating apparatus comprising:
   an optical waveguide;
   an active medium section in which a single electron is excited in response to application of exciting energy, wherein a single photon is emitted from said electron; and
   a resonator section which optically resonates with said active medium section, holds said photon emitted from said electron in said resonator, and transfers said held photon to said optical waveguide in response to a first control signal,
   wherein the application of said exciting energy is achieved by application of a first light pulse, and wherein said active medium section comprises:

a semiconductor substrate;

a quantum dot formed on said semiconductor substrate, wherein said electron is excited in response to the application of said exciting energy;

a cap layer which is provided between said quantum dot and said resonator section and optically separates said quantum dot from said resonator in response to a second control signal; and a first electrode formed on said cap layer apart from said quantum dot in a horizontal direction; and a second electrode formed on a surface of said semiconductor substrate opposite to said quantum dot in correspondence to said first electrode, wherein said first light pulse is applied to said quantum dot from a region where said second electrode is not formed.

5. The single photon generating apparatus according to claim 4, wherein said cap layer has a thickness equal to or less than ½ of a wavelength of said photon.

6. The single photon generating apparatus according to claim 4, further comprising a first applying section which applies a first electric signal between said first and second electrodes after said first light pulse is applied such that said quantum dot is optically separated from said resonator section.

7. The single photon generating apparatus according to claim 6, wherein said first applying section applies said first electric signal between said first and second electrodes in response to application of a second light pulse to said first applying section.

8. A single photon generating apparatus comprising:

an optical waveguide;

an active medium section in which a single electron is excited in response to application of exciting energy, wherein a single photon is emitted from said electron; and a resonator section which optically resonates with said active medium section, holds said photon emitted from said electron in said resonator, and transfers said held photon to said optical waveguide in response to a first control signal, wherein said resonator section comprises:

a resonator which optically resonates with said active medium section, and holds said photon therein; and a connection member which is provided between said resonator and said optical waveguide and passes said photon from said resonator to said optical waveguide in response to a second control signal.

9. The single photon generating apparatus according to claim 8, wherein said resonator has a Q value equal to or larger than $10^4$.

10. The single photon generating apparatus according to claim 8, wherein said resonator is formed of either semiconductor, dielectric substance and a local defective portion of photonic crystal where periodicity is disturbed.

11. The single photon generating apparatus according to claim 8, wherein said resonator has a spherical shape which has a characteristic length in a range from ½ of a wavelength of said photon to 100 times of the wavelength of said photon.

12. The single photon generating apparatus according to claim 8, wherein said connection member is made of electrooptic effect material, and said connection member changes a refractive index in response to said second control signal such that said photon is passed from said resonator to said optical waveguide.

13. The single photon generating apparatus according to claim 8, further comprising a second applying section which applies a voltage signal as said second control signal to said connection member.

14. The single photon generating apparatus according to claim 13, wherein said second applying section applies said second control signal to said connection member in response to application of a third pulse signal.

15. The single photon generating apparatus according to claim 14, wherein a response time of said second applying section is shorter than a lifetime of said photon.

16. A single photon generating apparatus comprising:

an optical waveguide;

an active medium section in which a single electron is excited in response to application of exciting energy, wherein a single photon is emitted from said electron; and a resonator section which optically resonates with said active medium section, holds said photon emitted from said electron in said resonator, and transfers said held photon to said optical waveguide in response to a first control signal, wherein said optical waveguide is arranged such that optical coupling between said optical waveguide and said resonator section in a whispering gallery mode is minimum.

17. A single photon generating apparatus comprising:

an optical waveguide;

an active medium section in which a single electron is excited in response to application of exciting energy, wherein a single photon is emitted from said electron; and a resonator section which optically resonates with said active medium section, holds said photon emitted from said electron in said resonator, and transfers said held photon to said optical waveguide in response to a first control signal, wherein said active medium section includes a quantum dot in which said electron is excited in response to the application of said exciting energy such that said photon is emitted, and said resonator section is formed by a first region of a photonic crystal other than a second region, wherein openings are arranged in triangular lattice in said second region of said photonic crystal, and said quantum dot is arranged in said first region.

18. The single photon generating apparatus according to claim 17, further comprising a light pulse applying section which applies a fourth light pulse as said first control signal to said resonator section.

19. The single photon generating apparatus according to claim 18, wherein said resonator section changes a refractive index in response to said fourth light pulse such that said photon is connected to said optical waveguide.

20. A method of generating a single photon, comprising:

(a) exciting a single electron in a quantum dot;

(b) confining a single photon generated from said electron in a resonator; and (c) leading said confined photon into an optical waveguide; and (d) minimizing optical coupling between said optical waveguide and said resonator in a whispering gallery mode.

21. The method according to claim 20, wherein said exciting step includes:

exciting said electron in said quantum dot in response to application of a light pulse.

22. A method of generating a single photon, comprising:
(a) exciting a single electron in a quantum dot;
(b) confining a single photon generated from said electron in a resonator; and
(c) leading said confined photon into an optical waveguide,
wherein said exciting step includes:
   exciting said electron in said quantum dot in response to application of a light pulse, and further comprising:
   (d) optically separating said quantum dot from said resonator after said photon is emitted from said electron.

23. A method of generating a single photon, comprising:
(a) exciting a single electron in a quantum dot;
(b) confining a single photon generated from said electron in a resonator; and
(c) leading said confined photon into an optical waveguide, wherein said leading step includes:
   (d) optically connecting said resonator with said optical waveguide in response to a control signal when said photon is confined in said resonator.

24. The method according to claim 23, wherein said optically connecting step includes:
   changing a refractive index of a connection member which is provided between said resonator and said optical waveguide in response to said control signal such that said connection member is transparent to said photon.

25. The method according to claim 24, wherein said control signal is a light pulse signal.

26. The method according to claim 23, wherein said optically connecting step includes:
   changing a refractive index of said resonator in response to said control signal such that said photon is connected to said optical waveguide.

* * * * *